United States Patent
Lydon et al.

(10) Patent No.: US 8,307,146 B2
(45) Date of Patent: Nov. 6, 2012

(54) COMMUNICATION BETWEEN A HOST DEVICE AND AN ACCESSORY VIA AN INTERMEDIATE DEVICE

(75) Inventors: Gregory T. Lydon, Santa Cruz, CA (US); Jay S. Laefer, San Mateo, CA (US); John Ananny, San Anselmo, CA (US); Terry Tikalsky, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/230,053

(22) Filed: Sep. 12, 2011

(65) Prior Publication Data

US 2012/0005395 A1  Jan. 5, 2012

Related U.S. Application Data

(62) Division of application No. 11/941,559, filed on Nov. 16, 2007, now Pat. No. 8,078,787.

(60) Provisional application No. 60/945,860, filed on Jun. 22, 2007.

(51) Int. Cl.
*G06F 13/38* (2006.01)
*G06F 13/14* (2006.01)

(52) U.S. Cl. ........................ 710/315; 710/105

(58) Field of Classification Search .............. 710/305, 710/306, 315, 104–106
See application file for complete search history.

(56) References Cited

U.S. PATENT DOCUMENTS

| | | | |
|---|---|---|---|
| 5,895,073 A | 4/1999 | Moore | |
| 5,903,849 A | 5/1999 | Selin et al. | |
| 5,923,757 A | 7/1999 | Hocker et al. | |
| 5,965,847 A | 10/1999 | Tanaka et al. | |
| 6,012,105 A | 1/2000 | Rubbmark et al. | |
| 6,058,319 A | 5/2000 | Sadler | |
| 6,304,764 B1 | 10/2001 | Pan | |
| 6,411,823 B1 | 6/2002 | Chen | |
| 6,591,085 B1 | 7/2003 | Grady | |
| 6,658,268 B1 | 12/2003 | Bodnar et al. | |

(Continued)

FOREIGN PATENT DOCUMENTS

EP  1478132 A1  11/2004

(Continued)

OTHER PUBLICATIONS

Bluetooth© Connecting Your Devices, May 2007 [online], [retrieved on Feb. 24, 2009]. Retrieved from the Internet <URL http://web.archive.org/web/20070408235213/www.bluetooth.com/Bluetooth/Connect/Devices/Generic_Pairing_Instructions.htm>, 2 pages.

(Continued)

*Primary Examiner* — Paul R Myers
*Assistant Examiner* — Trisha Vu
(74) *Attorney, Agent, or Firm* — Kilpatrick Townsend & Stockton LLP

(57) ABSTRACT

A host device and an accessory exchange information (e.g., commands and data) via an intermediate device. The host device and accessory can each connect to the intermediate device through a direct wired path and can exchange commands and data with the intermediate device. The host device and the accessory can also "tunnel" information to each other through the intermediate device, by packaging the tunneled information as a payload of a command recognizable by the intermediate device; the intermediate device can repackage and forward the payload. In some embodiments, the tunneled information relates to configuring a wireless link (e.g., a Bluetooth pairing) between the host device and the accessory.

25 Claims, 9 Drawing Sheets

U.S. PATENT DOCUMENTS

| | | | |
|---|---|---|---|
| 6,674,995 B1 | 1/2004 | Meyers et al. | |
| 6,678,535 B1 | 1/2004 | Narayanaswami | |
| 6,714,802 B1 | 3/2004 | Barvesten | |
| 6,724,339 B2 | 4/2004 | Conway et al. | |
| 6,725,061 B1 | 4/2004 | Hutchinson, IV et al. | |
| 6,772,331 B1 | 8/2004 | Hind et al. | |
| 6,837,827 B1 | 1/2005 | Lee et al. | |
| 6,928,295 B2 | 8/2005 | Olson et al. | |
| 7,007,127 B2 * | 2/2006 | Lin | 710/315 |
| 7,104,848 B1 | 9/2006 | Chou et al. | |
| 7,149,543 B2 | 12/2006 | Kumar | |
| 7,164,886 B2 | 1/2007 | Mowery et al. | |
| 7,174,130 B2 | 2/2007 | Kurisko et al. | |
| 7,187,948 B2 | 3/2007 | Alden | |
| 7,200,660 B2 | 4/2007 | Bruegger et al. | |
| 7,215,649 B2 | 5/2007 | Yu et al. | |
| 7,216,043 B2 | 5/2007 | Ransom et al. | |
| 7,254,516 B2 | 8/2007 | Case, Jr. et al. | |
| 7,260,112 B2 | 8/2007 | Moretti et al. | |
| 7,293,122 B1 | 11/2007 | Schubert et al. | |
| 7,564,678 B2 | 7/2009 | Langberg | |
| 7,623,667 B2 | 11/2009 | Sander et al. | |
| 7,813,715 B2 | 10/2010 | McKillop | |
| 7,913,297 B2 | 3/2011 | Wyld | |
| 8,078,787 B2 | 12/2011 | Lydon et al. | |
| 8,086,781 B2 | 12/2011 | Ananny et al. | |
| 2002/0002035 A1 | 1/2002 | Sim et al. | |
| 2002/0068610 A1 | 6/2002 | Anvekar et al. | |
| 2002/0103008 A1 | 8/2002 | Rahn et al. | |
| 2003/0050009 A1 | 3/2003 | Kurisko et al. | |
| 2003/0220988 A1 | 11/2003 | Hymel | |
| 2004/0048569 A1 | 3/2004 | Kawamura | |
| 2004/0198436 A1 | 10/2004 | Alden | |
| 2005/0027910 A1 | 2/2005 | Barrett et al. | |
| 2005/0044372 A1 | 2/2005 | Aull et al. | |
| 2005/0060470 A1 | 3/2005 | Main et al. | |
| 2005/0152294 A1 | 7/2005 | Yu et al. | |
| 2005/0157748 A1 | 7/2005 | Park | |
| 2006/0046793 A1 | 3/2006 | Hamilton et al. | |
| 2006/0068760 A1 | 3/2006 | Hameed et al. | |
| 2006/0143455 A1 | 6/2006 | Gitzinger | |
| 2006/0156415 A1 | 7/2006 | Rubinshtein et al. | |
| 2007/0032195 A1 | 2/2007 | Kurisko et al. | |
| 2007/0074280 A1 | 3/2007 | Callaghan | |
| 2007/0080823 A1 | 4/2007 | Fu et al. | |
| 2007/0135092 A1 | 6/2007 | Pieronek et al. | |
| 2007/0238475 A1 | 10/2007 | Goedken | |
| 2008/0227393 A1 | 9/2008 | Tang et al. | |
| 2008/0320190 A1 | 12/2008 | Lydon | |
| 2010/0075604 A1 | 3/2010 | Lydon et al. | |
| 2010/0180063 A1 | 7/2010 | Ananny | |
| 2012/0003934 A1 | 1/2012 | Lydon et al. | |
| 2012/0003935 A1 | 1/2012 | Lydon et al. | |

FOREIGN PATENT DOCUMENTS

| | | |
|---|---|---|
| EP | 1536615 A1 | 6/2005 |
| EP | 1698518 A2 | 9/2006 |
| JP | 2003/032351 A | 1/2003 |
| JP | 2003/274386 A | 9/2003 |
| WO | WO 00/60450 A1 | 10/2000 |
| WO | WO 02/096069 A2 | 11/2002 |
| WO | WO 2005/109781 A1 | 11/2005 |
| WO | WO 2007/068164 A1 | 6/2007 |
| WO | WO 2009/002786 A | 12/2008 |

OTHER PUBLICATIONS

U.S. Appl. No. 13/230,064, filed Sep. 12, 2011, Lydon et al.
U.S. Appl. No. 13/230,078, filed Sep. 12, 2011, Lydon et al.
"iPodDock-iPod Cradle," www.bookendzdocks.com-bookendz-dock_cradle.html, downloaded Feb. 27, 2003, 2 pages.
Scosche, "Scosche passPORT Charging Adaptor for iPod Touch 2G, 3G; iPod nano 4G; iPhone 3G (Black)," 6 pages, Oct. 1, 2008, 6 pages.
Simpson, "The Point-To-Point Protocol (PPP)," Jul. 1994 [online], [retrieved on Feb. 24, 2009]. Retrieved from the Internet <URL http://www.ief.org/rfc/rfc1661.txt>, 50 pages.

* cited by examiner

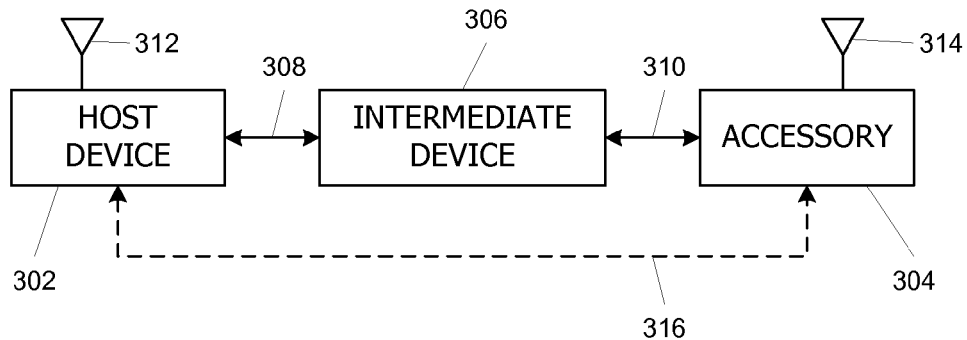

FIG. 3

| COMMAND | DIRECTION | PAYLOAD |
|---|---|---|
| TxHTunnelToAccessory | H → I | Tunneled command originating from host |
| AckHTunnelToAccessory | I → H | Transaction ID, status |
| TxHTunnelToHost | I → H | Tunneled command originating from accessory |
| AckHTunnelToHost | H → I | Transaction ID, status |
| GetTunnelCtlToHost | H → I | (none) |
| TxTunnelCtlToHost | I → H | Status of connection to accessory |
| AckTunnelCtlToHost | H → I | Transaction ID, status |

FIG. 4A

| COMMAND | DIRECTION | PAYLOAD |
|---|---|---|
| TxATunnelToHost | A → I | Tunneled command originating from accessory |
| AckCmdToAccessory | I → A | Transaction ID, status |
| TxATunnelToAccessory | I → A | Tunneled command originating from host |
| AckCmdFromAccessory | A → I | Transaction ID, status |
| AStatusBeacon | A → I | Status information |

FIG. 4B

| COMMAND | DATA |
|---|---|
| HostAck | Status information related to received command |
| GetAccVersion | (none) |
| GetAccInfo | Type of information requested |
| GetAccBTAddr | Index of pairing slot |
| SetAccBTAddr | Index of pairing slot, BT address |
| GetAccBTState | (none) |
| SetAccBTState | State parameter value |
| GetAccBTName | (none) |
| SetAccBTName | BT name to be applied to accessory |
| DelAccBTPairs | (none) |

*FIG. 7A*

| COMMAND | DATA |
|---|---|
| AccIdentify | Unique identifier of the accessory |
| AccAck | Status information related to received command |
| RetAccVersion | Version of tunnel protocol supported by accessory |
| RetAccInfo | Information responsive to GetAccInfo command |
| RetAccBTAddr | BT Address for pairing slot specified in GetAccBTAddr command |
| RetAccBTState | BT state information for the accessory |
| RetAccBTName | Current BT name of the accessory |

*FIG. 7B*

COMMUNICATION BETWEEN A HOST DEVICE AND AN ACCESSORY VIA AN INTERMEDIATE DEVICE

CROSS-REFERENCES TO RELATED APPLICATIONS

The present application is a divisional application of U.S. application Ser. No. 11/941,559, filed Nov. 16, 2007, now U.S. Publication No. 2008/0320190, published Dec. 25, 2008, the entire contents of which are incorporated herein by reference for all purposes. U.S. application Ser. No. 11/941,559 claims the benefit and priority under 35 U.S.C. 119(e) of U.S. Provisional Application No. 60/945,860, filed Jun. 22, 2007, the entire contents of which are incorporated herein by reference for all purposes.

FIELD OF THE INVENTION

The present invention relates generally to communication of information between electronic devices and in particular to communication of information between a host device and an accessory via an intermediate device.

BACKGROUND OF THE INVENTION

Recently, there has been considerable interest in providing short-range wireless devices that are easily interoperable with other devices not necessarily produced by the same manufacturer. For instance, it is desirable to provide wireless headsets for mobile phones that will work with phones made by different manufacturers, or to provide keyboards, mice or other peripheral devices that will work with computers made by different manufacturers. Interoperability increases consumer choice and flexibility.

Various standards bodies and industry groups have defined standards for short-range wireless communication. One common example is the standard developed by the Bluetooth Special Interest Group (a non-profit organization) and licensed under the trademark Bluetooth®. The Bluetooth standard (referred to herein simply as "Bluetooth") allows a host device such as a mobile phone and an accessory such as a headset to establish a wireless "pairing." A pairing is usually established through a partly-automated, partly-manual process. For example, a wireless headset might send a signal identifying itself as a Bluetooth-enabled device. A mobile phone detects this signal and thus determine that the accessory is available for pairing. The mobile phone then prompts the user to enter a "passcode" or "PIN code" for the accessory. In some cases, the accessory's passcode is hard-coded in the accessory, and the user must look up the passcode (e.g., in documentation associated with the accessory) and enter it into the mobile phone. In other cases, the accessory's passcode is not hard-coded, and the accessory can make up an arbitrary passcode, which the user then enters into the mobile phone.

In either case, after receiving the passcode from the user, the mobile phone sends the passcode to the accessory. If the passcode matches the accessory's passcode, the accessory confirms the match, and a pairing is established. If the passcode does not match, the pairing is not established, and the user may be advised of the failure and allowed to retry. The number of retries is normally limited to prevent unauthorized users from determining passcodes through trial and error.

The Bluetooth standard also provides for encryption of data transmitted between paired devices. Symmetric-key cryptography, in which the same "link key" is used for both encryption and decryption, is used. The initial link key is generated independently by both devices using the passcode and a random number that is generated by one of the paired devices and transmitted to the other as cleartext. Thereafter, the two devices can generate a new link key. However, because the random number and the passcode are transmitted wirelessly as cleartext, an interloper could gain access to that information and determine the initial link key, then monitor subsequent transmissions.

Thus, existing procedures for configuring Bluetooth or other wireless links can be cumbersome, and the links themselves might not be as secure as desired.

It would therefore be desirable to provide improved methods for communicating information, such as information related to configuring a Bluetooth or other wireless communication link, between two devices.

BRIEF SUMMARY OF THE INVENTION

Embodiments of the present invention relate to communication of information between electronic devices and in particular to communication of information between a host device and an accessory via an intermediate device. The host device and the accessory can "tunnel" commands and data to each other through the intermediate device. For example, the host can send a "tunneling" command to the intermediate device, with a command and/or data intended for the accessory packaged as a payload inside the tunneling command. The intermediate device can repackage the payload as a tunneling command in a format suitable for sending to the accessory and can send this latter tunneling command to the accessory. The accessory can unpackage the payload and interpret it as a command from the host. Communication from the accessory to the host device can be accomplished in a similar manner.

Any type of information can be exchanged using tunneling commands. In some embodiments, the information communicated may relate to configuring a wireless communication link (e.g., a Bluetooth pairing) between the host device and the accessory. For example, the host can provide to the accessory parameters establishing a Bluetooth pairing or other wireless link. Thus, an indirect (and possibly wired) channel connecting the host and the accessory can be used to configure an alternative (wireless) connection. In still other embodiments, a host device and an accessory can communicate directly via a first link (such as a direct wired connection) to establish a second link (such as a Bluetooth pairing or other wireless link) without using tunneling commands or an intermediate device.

In one aspect, the present invention relates to a system for communicating information between a host device and an accessory. The system includes an intermediate device, which can be an electronic device configured to couple to a host device and further configured to communicate with the host device according to a first protocol. The intermediate device can also be configured to couple to an accessory interoperable with the host device and further configured to communicate with the accessory according to a second protocol. The first protocol can include a first tunneling command usable by the host device to instruct the intermediate device to forward tunneled information associated with the first tunneling command to the accessory, and the second protocol can include a second tunneling command usable by the intermediate device to deliver the tunneled information associated with the first tunneling command to the accessory. For communication in the other direction, the second protocol can also include a third tunneling command usable by the accessory to instruct the intermediate device to forward tunneled information associated with the third tunneling command to the host device, and the first protocol can include a fourth tunneling command usable by the intermediate device to deliver the tunneled information associated with the third tunneling command to the host device. Any type of information can be tunneled, and in particular a command originated from either the host device or the accessory to be executed by either the accessory or the host device, and/or data associated with such a command, can be tunneled. In some embodiments, the tunneled commands and/or data relate to establishing a wireless link (e.g., a Bluetooth pairing) between the host device and the accessory.

In another aspect, the present invention relates to another system for communicating information. The system can include a host device (e.g., a mobile phone, media player, or multipurpose device) having a communication interface, an accessory (e.g., a wireless headset, stereo headphone, or remote control) having a communication interface, and an intermediate device having a first communication interface adapted to connect to the communication interface of the host device and a second communication interface adapted to connect to the communication interface of the accessory. The intermediate device can be configured to communicate with the host device using a first protocol and to communicate with the accessory using a second protocol. Each of the first protocol and the second protocol can include a tunneling command receivable by the intermediate device, and the tunneling command in each of the first protocol and the second protocol can instruct the intermediate device to use the other of the first protocol and the second protocol to forward a payload associated with the received tunneling command.

In another aspect, the present invention relates to a method for communicating information between a host device and an accessory. A host device can determine an information item to be delivered to an accessory, the information item conforming to a tunnel protocol. The host device can generate a first tunneling command to be delivered to an intermediate device; the first tunneling command can conform to a first protocol and incorporating the information item as tunneled information. The host device can transmit the first tunneling command to the intermediate device, which can convert the first tunneling command to a second tunneling command conforming to a second protocol and incorporating the information item as tunneled information and can transmit the second tunneling command to the accessory, thereby delivering the tunneled information item to the accessory. The command can include, e.g., information usable to establish a wireless link (e.g., a Bluetooth pairing) between the host device and the accessory.

In another aspect, the invention relates to a method for communicating information between a first electronic device (such as a host device or accessory) and a second electronic device (such as an accessory or host device). The first electronic device can determine an information item to be delivered to a second electronic device, with the information item conforming to a tunnel protocol. The first electronic device can generate a first tunneling command to be delivered to an intermediate device. The first tunneling command can conform to a first protocol and can incorporate the information item as tunneled information. The first electronic device can transmit the first tunneling command to the intermediate device. The intermediate device can convert the first tunneling command to a second tunneling command conforming to a second protocol and incorporating the information item as tunneled information and can transmit the second tunneling command to the second electronic device. The second electronic device can receive the second tunneling command and can extract the information item from the second tunneling command.

In another aspect, the invention relates to a method for communicating information between a first electronic device and a second electronic device. An intermediate device can receive a first tunneling command from a first electronic device. The first tunneling command can conform to a first protocol and can incorporate a tunneled information item therein. The intermediate device can convert the first tunneling command to a second tunneling command. The second tunneling command can conform to a second protocol and can incorporate the tunneled information item therein. The intermediate device can transmit the second tunneling command to a second electronic device, and the second electronic device can be configured to extract the tunneled information item from the second tunneling command.

In another aspect, the invention relates to a method for establishing a wireless link (e.g., a Bluetooth pairing) between a host device and an accessory. A point-to-point wired connection can be established between the host device and the accessory. The point-to-point wired connection can provides for an exchange of commands and data between the host device and the accessory. The accessory can provide to the host device, via the point-to-point wired connection, data indicative of a wireless communication capability of the accessory; the data can include, e.g., a wireless address of the accessory. The host device can provide to the accessory, via the point-to-point wired connection, a command instructing the accessory to establish a wireless link with the host device; the command can include, e.g., a wireless address of the host device. The accessory can establish the wireless link with the host device in response to the command.

In another aspect, the invention relates to a method for establishing a wireless link between a host device and an accessory that can be performed by a host device. The host device can detect a wired connection to the accessory, where the wired connection provides for an exchange of commands and data between the host device and the accessory. The host device can obtain from the accessory, using the wired connection, information pertaining to a wireless communication capability of the accessory; this information can include, e.g., a wireless address of the accessory. The host device can provide to the accessory, using the wired connection, information defining or configuring a new wireless link between the accessory and the host device; the information provided to the accessory can include, e.g., a wireless address of the host device. The wireless link can be established in response to the accessory receiving the information defining the new wireless link.

In another aspect, the invention relates to a method for establishing a Bluetooth pairing between a host device and an accessory. The host device can determine when the host device and the accessory are each coupled to a common intermediate device that is configured to receive tunneling commands from the host device and the accessory and to forward a payload of each received tunneling command to the other of the host device and the accessory. The host device can obtain from the accessory, via the intermediate device, information regarding a Bluetooth capability of the accessory; the information can include, e.g., a number of Bluetooth pairing slots supported by the accessory. The host device can also obtain from the accessory, via the intermediate device, current Bluetooth pairing information for the accessory (which information can include, e.g., a Bluetooth address of the accessory). In the event that the current Bluetooth pairing information does not include information corresponding to a pairing with the host device, the host device can send to the accessory, via the intermediate device, information establishing a Bluetooth pairing between the accessory and the host device (which information can include, e.g., a Bluetooth address of the host device).

In another aspect, the invention relates to a method for establishing a wireless link between a host device and an accessory that can be performed by an accessory. The accessory can detect a wired connection to the host device, where the wired connection provides for an exchange of commands and data between the host device and the accessory. The accessory can provide to the host device, using the wired connection, information pertaining to a wireless communication capability of the accessory; the information can include, e.g., a wireless address of the accessory. The accessory can receive from the host device, using the wired connection, information defining a new wireless link between the accessory and the host device; the received information can include a wireless address of the host device. The accessory can establish the wireless link to the host device in response to receiving the information defining the new wireless link.

In another aspect, the invention relates to a method for establishing a Bluetooth pairing between a host device and an accessory. The accessory can detect that the host device and the accessory are each coupled to a common intermediate device, wherein the intermediate device is configured to receive tunneling commands from the host device and the accessory and to forward a payload of each received tunneling command to the other of the host device and the accessory. The accessory can provide to the host device, via the intermediate device, information regarding a Bluetooth capability of the accessory; the information can include, e.g., a number of Bluetooth pairing slots supported by the accessory. The accessory can also provide to the host device, via the intermediate device, current Bluetooth pairing information for the accessory (which information can include, e.g., a Bluetooth address of the accessory). The accessory can receive from the host device, via the intermediate device, information establishing a new Bluetooth pairing between the accessory and the host device (which information can include, e.g., a Bluetooth address of the host device).

In another aspect, the invention relates to a portable electronic device. The portable electronic device can include a wireless transceiver configured to send and receive wireless signals, an interface configured to communicate with an intermediate device via a wired signal path, and a processor communicably coupled to the wireless transceiver and the interface. The interface can be configured to support a tunneling protocol usable to send to the intermediate device tunneled commands to be forwarded to an accessory and to receive from the intermediate device tunneled commands originating from the accessory. The processor can be configured to generate tunneled commands to be sent to the accessory and to interpret and respond to tunneled commands received from the accessory. The processor can also be configured to obtain from the accessory via the intermediate device, using the tunneled commands, information pertaining to a wireless communication capability of the accessory, the information including a wireless address of the accessory and to provide to the accessory via the intermediate device, using the tunneled commands, a command instructing the accessory to establish a wireless link with the portable electronic device, the command including a wireless address of the wireless transceiver of the portable electronic device.

In another aspect, the present invention relates to accessory for use with a portable electronic device. The accessory can include a wireless transceiver configured to send and receive wireless signals, an interface configured to communicate with an intermediate device via a wired signal path, and a controller communicably coupled to the wireless transceiver and the interface. The interface can be configured to support a tunneling protocol usable to send to the intermediate device tunneled commands to be forwarded to a host device and to receive from the intermediate device tunneled commands originating from the host device. The controller can be configured to generate tunneled commands to be sent to the host device and to interpret and respond to tunneled commands received from the host device and can be further configured to provide to the host device via the intermediate device, using the tunneled commands, information pertaining to a wireless communication capability of the accessory, the information including a wireless address of the wireless transceiver of accessory and to receive from the host device via the intermediate device, using the tunneled commands, a command instructing the accessory to establish a wireless link with the portable electronic device, the command including a wireless address of the host device.

The following detailed description together with the accompanying drawings will provide a better understanding of the nature and advantages of the present invention.

BRIEF DESCRIPTION OF THE DRAWINGS

FIG. 3 is a block diagram showing communication paths among a host device, accessory and intermediate device according to an embodiment of the present invention.

FIG. 4A is a table listing tunneling commands for a host-side protocol according to an embodiment of the present invention.

FIG. 4B is a table listing tunneling commands for an accessory-side protocol according to an embodiment of the present invention.

FIG. 7A is a table listing tunnel protocol commands that can be sent by a host device to an accessory according to an embodiment of the present invention.

FIG. 7B is a table listing tunnel protocol commands that can be sent by an accessory to a host device according to an embodiment of the present invention.

DETAILED DESCRIPTION OF THE INVENTION

Embodiments of the present invention relate to communication of information between electronic devices and in particular to communication of information between a host device and an accessory via an intermediate device. The host device and the accessory can "tunnel" commands and data to each other through the intermediate device. For example, the host can send a "tunneling" command to the intermediate device, with a command and/or data intended for the accessory packaged as a payload inside the tunneling command. The intermediate device can repackage the payload as a tunneling command in a format suitable for sending to the accessory and can send this latter tunneling command to the accessory. The accessory can unpackage the payload and interprets it as a command from the host. Communication from the accessory to the host device can be accomplished in a similar manner.

Any type of information can be exchanged using tunneling commands. In some embodiments, the information communicated may relate to configuring a wireless communication link (e.g., a Bluetooth pairing) between the host device and the accessory. For example, the host can provide to the accessory parameters establishing a Bluetooth pairing or other wireless link. Thus, an indirect (and possibly wired) channel connecting the host and the accessory can be used to configure an alternative (wireless) connection. In still other embodiments, a host device and an accessory can communicate directly via a first link (such as a direct wired connection) to establish a second link (such as a Bluetooth pairing or other wireless link) without using tunneling commands or an intermediate device.

Host Devices and Accessories

Figure 1A:
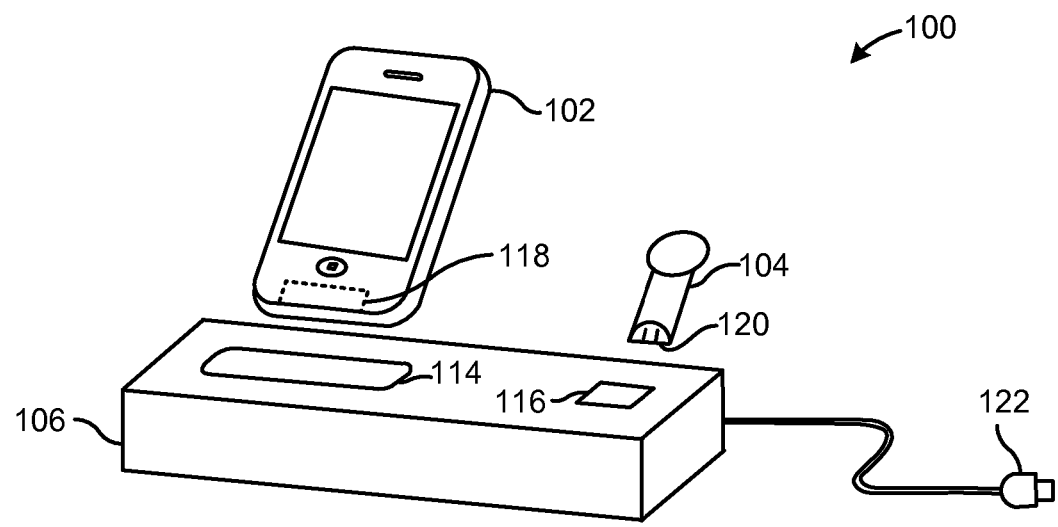
FIGS. 1A and 1B illustrate systems with a host device connected to an accessory through an intermediate device according to embodiments of the present invention.

FIG. 1A illustrates system 100 according to an embodiment of the present invention. System 100 includes host device 102, accessory 104, and intermediate device 106. In some embodiments, host device 102 can be a media player, such as any iPod™ media player produced and sold by Apple, Inc., assignee of the present application. In general, a media player can be any device capable of storing and playing media assets, including but not limited to audio, video, and/or still images. Alternatively, host device 102 can be a mobile phone (e.g., using conventional cellular communication technology), a personal digital assistant (PDA), or a multifunctional device that incorporates a combination of media player, mobile phone, and/or PDA capabilities, such as an iPhone™ mobile device produced and sold by Apple, Inc.. Host device 102 might also be a general-purpose computer, such as a handheld computer, laptop computer, desktop computer, or the like.

Accessory 104 can be any accessory adapted to interoperate with host device 102. For example, in an embodiment where host device 102 incorporates a mobile phone, accessory 104 might be a hands-free headset adapted for use with host device 102 and might include, e.g., an earbud speaker 108 and microphone 110 connected to a body member 112.

In some embodiments, accessory 104 is capable of communicating wirelessly with host device 102 once a channel for wireless communication has been established between the two. For example, accessory 104 and host device 102 may each be provided with Bluetooth technology, including appropriate short-range transceiver units. In some embodiments, it may be possible to establish a Bluetooth pairing between host device 102 and accessory 104 using conventional techniques, such as manual entry of a passcode (or PIN code) associated with accessory 104 into host device 102. In other embodiments, Bluetooth pairings can be established automatically as described below.

Accessory 104 may also have the capability of supporting multiple Bluetooth (or other wired or wireless) pairings. For example, accessory 104 can have sufficient storage capability to store pairing information, such as a Bluetooth address of a paired device (e.g., host device 102) and an associated link key, for multiple pairings with different devices (e.g., up to 256 pairings in some embodiments). Such an accessory 104 is described herein as having multiple "pairing slots." When in use, accessory 104 communicates with only one of its paired devices at a given time, and the paired device to be used can be selected, e.g., based on user operation of the paired device(s) and/or algorithms within accessory 104 that prioritize the paired devices (e.g., a most recently used device or other pre-specified default device might be selected in the absence of user instructions). Thus, for example, a user can pair the same wireless headset (an example of accessory 104) with multiple phone handsets, with a phone handset and a computer terminal, with a phone handset and a media player, and so on. Configuration of an accessory with multiple pairing slots is described below; it is to be understood that accessories with any number of pairing slots (including just one pairing slot) can be used in connection with the present invention.

Other accessories may be substituted for accessory 104 shown in FIG. 1A. For example, if host device 102 includes media player capability, accessory 104 can be a pair of stereo headphones and/or a display screen adapted to communicate wirelessly with host device 102. Accessory 104 can also provide a wireless user input device (such as a keyboard, mouse, remote control or the like) for controlling operation of host device 102.

In the embodiment shown in FIG. 1A, intermediate device 106 can be a docking station having a first receptacle 114 adapted to receive host device 102 and a second receptacle 116 adapted to receive accessory 104. Host device 102 can include a connector 118, and receptacle 114 can include a mating connector (not explicitly shown) such that when host device 102 is placed into receptacle 114, host device 102 becomes physically and electrically coupled to intermediate device 106. When so coupled, information can be exchanged in the form of electrical signals between host device 102 and intermediate device 106. In one embodiment, connector 118 can be the 30-pin connector provided on an iPod™ or iPhone™, but other connectors, such as standard USB and/or FireWire (IEEE 1394) connectors or any other type of connector might also be used.

Similarly, accessory 104 can include a connector 120, and receptacle 116 can include a mating connector (not explicitly shown) such that when accessory 104 is placed into receptacle 116, accessory 104 becomes physically and electrically coupled to intermediate device 106. When so coupled, information can be exchanged in the form of electrical signals between accessory 104 and intermediate device 106. In one embodiment, connector 120 includes at least power and ground contacts, and at least one pair of transmit and receive contacts for serial communication. As with connector 118 described above, any type of connector can be used.

In some embodiments, intermediate device 106 is also capable of connecting to other devices or systems. For example, intermediate device 106 may include connector 122, which can be, e.g., a USB or FireWire (IEEE 1394) connector or the like. Connector 122 can be connected to a personal computer system (not explicitly shown), thereby allowing host device 102 and/or accessory 104 to exchange information with the computer system. Thus, for instance, in an embodiment where host device 102 includes media player capability, media assets can be transferred to host device 102 from a computer system via connector 122 and intermediate device 106.

In some embodiments, intermediate device 106 is also capable of providing power to host device 102 and/or accessory 104. For instance, intermediate device 106 may include a power cable (not explicitly shown) that can be plugged into a conventional wall outlet. Alternatively or in addition, when connector 122 is connected to a computer system, intermediate device 106 can draw power via connector 122 and supply such power to host device 102 and/or accessory 104. Power supplied by intermediate device 106 can be used, e.g., to charge batteries that may be included in host device 102 and/or accessory 104.

Host device 102 and accessory 104 are independently connectable to (and detachable from) intermediate device 106. Thus, at any given time, either, neither or both of host device 102 and accessory 104 can be connected to intermediate device 106. When host device 102 and accessory 104 are both connected to intermediate device 106, communication between host device 102 and accessory 104 via intermediate device 106 becomes possible, as described below.

Figure 1B:
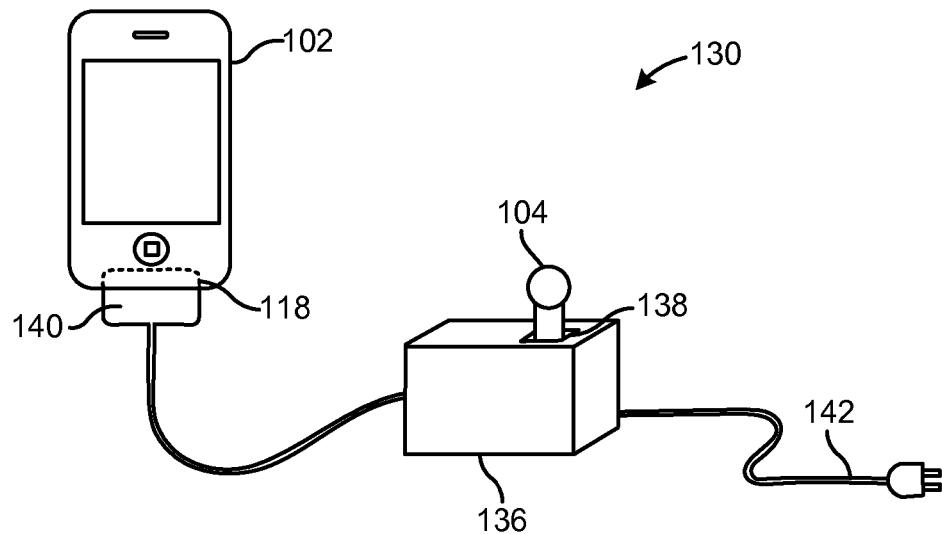

FIG. 1B illustrates system 130 according to another embodiment of the present invention. In system 130, host device 102 and accessory 104 can each be connected to intermediate device 136. Intermediate device 136 provides receptacle 138 that can receive accessory 104 (similar to receptacle 116 of FIG. 1A) and cable 140 adapted to connect to connector 118 of host device 102. Intermediate device 136 can also include power cable 142, which can be used to supply power to host device 102 and/or accessory 104. In one embodiment, intermediate device 136 is similar to intermediate device 106 except that intermediate device 136 is optimized for portability. Thus, while intermediate device 106 might be a docking station for home or office use, intermediate device 136 might be a travel charger that can easily be carried by a user (e.g., in a briefcase or other luggage).

As with system 100, in system 130 host device 102 and accessory 104 are independently connectable to (and detachable from) intermediate device 136. Thus, at any given time, either, neither or both of host device 102 and accessory 104 can be connected to intermediate device 136. When host device 102 and accessory 104 are both connected to intermediate device 136, communication between host device 102 and accessory 104 via intermediate device 136 becomes possible, as described below.

"Host Device" and "Accessory" are used herein to distinguish two electronic devices. In general, a "host device" can be any type of personal communication and/or computing device, e.g., a media player, mobile phone, PDA, handheld computer, laptop computer, desktop computer, etc. "Accessory" can be any device that facilitates use or enhances capability of a host device, e.g., a headset with earphone and microphone, stereo headphones, microphone, remote control, keyboard, mouse, etc.

An "intermediate device" is any device that can be connected to at least a host device and an accessory at the same time. The intermediate device is capable of communicating with the host device and the accessory, in particular forwarding, or "tunneling," commands from one of the host device or accessory to the other. The intermediate device may also support other functionality, such as charging the host device and/or accessory.

Figure 2:
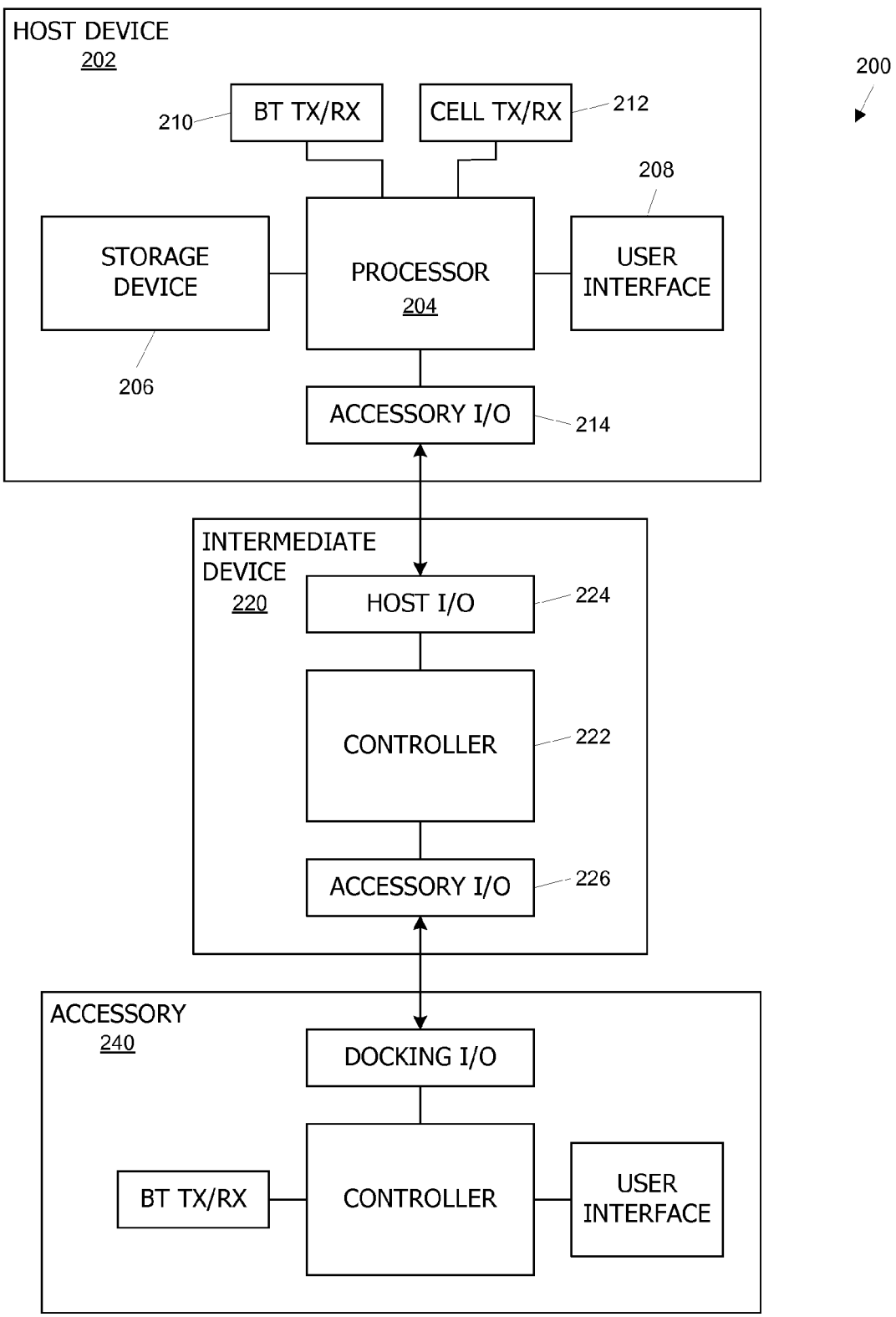
FIG. 2 is a block diagram of a system including a host device, accessory and intermediate device according to an embodiment of the present invention.

FIG. 2 is a block diagram of system 200 according to an embodiment of the present invention. System 200 can include a host device 202 (e.g., implementing host device 102 of FIGS. 1A-1B), an accessory 220 (e.g., implementing accessory 104 of FIGS. 1A-1B), and an intermediate device 240 (e.g., implementing intermediate device 106 of FIG. 1A or intermediate device 136 of FIG. 1B).

Host device 202 in this embodiment can provide media player and mobile phone capability. Host device 202 can include processor 204, storage device 206, user interface 208, Bluetooth (BT) transceiver 210, cellular transceiver 212, and accessory input/output (I/O) interface 214.

Storage device 206 may be implemented, e.g., using disk, flash memory, or any other non-volatile storage medium. In some embodiments, storage device 206 can store media assets (e.g., audio, video, still images, or the like) that can be played by host device 202. In other embodiments, storage device 206 can store other information such as information about a user's contacts (names, addresses, phone numbers, etc.); scheduled appointments and events; notes; and/or other personal information. In still other embodiments, storage device 206 can store one or more programs to be executed by processor 204 (e.g., video game programs, personal information management programs, etc.).

User interface 208 may include input controls such as a touch pad, touch screen, scroll wheel, click wheel, dial, button, keypad, microphone, or the like, as well as output devices such as video screen, indicator lights, speakers, headphone jacks or the like, together with supporting electronics (e.g., digital-to-analog or analog-to-digital converters, signal processors or the like). A user can operate the various input controls of user interface 208 to invoke the functionality of host device 202 and can view and/or hear output from host device 202.

Processor 204, which can be implemented as one or more integrated circuits, can control the operation of host device 202. For example, in response to user input signals provided by user interface 208, processor 204 can initiate programs to search, list or play media assets stored in storage device 206. In communication with cellular transceiver 212, processor 204 can control placing and receiving of telephone calls.

Cellular transceiver 212, which may include conventional cellular telephone components such as an RF transmitter, receiver, and signal processing circuitry, can be used to place and/or receive telephone calls via a cellular network. Other mobile telephone or real-time mobile telecommunication technologies may be substituted; the invention is not limited to conventional cellular networks.

Bluetooth transceiver 210 can be used to support short-range wireless communication between host device 202 and various accessory devices, including accessory 204. Use of Bluetooth is not required, and host device 202 may communicate with accessories using other wired and/or wireless protocols.

Accessory I/O interface 214 can allow host device 202 to communicate with various accessories. In one embodiment, accessory I/O interface 214 includes a 30-pin connector corresponding to the connector used on iPod™ products manufactured and sold by Apple, Inc. For example, accessory I/O interface 214 might support connections to an external speaker dock, a radio (e.g., FM, AM and/or satellite) tuner, an external video device, or the like. In accordance with an embodiment of the present invention, accessory I/O interface 214 allows host device 202 to communicate with intermediate device 206.

Intermediate device 220 can include controller (e.g., microcontroller) 222, host I/O interface 224 and accessory I/O interface 226. Host I/O interface 224 allows intermediate device 220 to communicate with host device 202 and may include suitable hardware and/or software components, e.g., a 30-pin connector capable of coupling with a corresponding connector on host device 202. Similarly, accessory I/O interface 226 allows intermediate device 220 to communicate with accessory 240 and may include suitable hardware and/or software components.

Controller 222 can be used to execute one or more control programs for intermediate device 220. Such control programs may be stored in memory (e.g., programmable read-only memory) integrated with controller 222 or in separate memory devices or circuits (not shown). The control programs can enable controller 222 to detect the presence of host device 202 and/or accessory 240 and to communicate with either or both of host device 202 and/or accessory 240, e.g., via host I/O interface 224 and/or accessory I/O interface 226. For example, the control programs can enable intermediate device 220 to determine whether host device 202 or accessory 240 requires power and to supply power as required, e.g., for charging of host device 202 or accessory 240; it is to be understood that both host device 202 and accessory 240 may be charging at the same time. The control programs can also enable intermediate device 220 to forward commands received from one of host device 202 or accessory 240 to the other of host device 202 or accessory 240, as described below.

In some embodiments, intermediate device 220 may also include additional interfaces adapted to communicate with other devices, such as a personal computer or another accessory. It is to be understood that intermediate device 220 can include any number of I/O interfaces and associated control programs; any combination of I/O interfaces may be in use at a given time depending on which connections are made.

It will be appreciated that the system configurations and components described herein are illustrative and that variations and modifications are possible. Any host device and accessory can be coupled via a suitably configured intermediate device.

Tunneling Commands

FIG. 3 illustrates system 300 with communication among host device 302, accessory 304 and intermediate device 306. Host device 302 can be, for example, host device 102 of FIGS. 1A and 1B or host device 202 of FIG. 2. Accessory 304 can be, for example, accessory 104 of FIGS. 1A and 1B or accessory 240 of FIG. 2. Intermediate device 306 can be, for example, intermediate device 106 of FIG. 1A, intermediate device 136 of FIG. 1B, or intermediate device 220 of FIG. 2.

As shown, host device 302 can communicate with intermediate device 306 via first connection 308 (e.g., a cable, docking connection, or other wired connection). Intermediate device 306 can communicate with accessory 304 via second connection 310 (e.g., a cable, docking connection or other wired connection). Host device 302 can include wireless (e.g., Bluetooth or other short-range wireless) connection 312, and accessory 304 can include compatible wireless connection 314. Thus, host device 302 and accessory 304 can communicate wirelessly.

Host device 302 and accessory 304 can also communicate via virtual wired path 316 (indicated by a dotted line) even though there is no direct wire connection between them. In some embodiments of the present communication, virtual wired path 316 is implemented by using intermediate device 306 to "tunnel" information between host device 302 and accessory 310.

For example, host device 302 can communicate with intermediate device 306 by exchanging commands according to a "host-side" command protocol that is mutually understood by both devices. In one embodiment, the protocol may specify that each command is a packet with a header and a payload. The header, which is fixed-length, can specify, e.g., the packet size, a command to be read and responded to by the recipient, and a transaction identifier. The payload, which can be variable-length, can include data associated with the command. The packet can also include other information, such as cyclic redundancy check data or other data usable by a packet recipient to detect and/or correct errors in the transmission or reception of a packet.

Similarly, accessory 304 can communicate with intermediate device 306 by exchanging commands according to an "accessory-side" command protocol that is mutually understood by both devices. Like host-side commands, in one embodiment, the accessory-side protocol may specify that each command can be a packet with a header and a payload. In one embodiment, the header, which is fixed-length, specifies, e.g., the packet size, a command to be read and responded to by the recipient, and a transaction identifier. The payload, which is variable-length, includes data associated with the command. Other information, such as error detection and/or correction codes, can also be included.

It is allowed but not required that the host-side and accessory-side protocols use the same command format; in fact, either protocol can specify any format. Thus, for instance, the accessory-side command protocol might specify an explicit start byte and/or termination byte for each packet, while the host-side protocol does not use start or termination bytes. As is known in the art, a start byte or termination byte is a specific value (e.g., 8 bits) indicating the beginning or end of a packet. Where start bytes (or termination bytes) are used, a byte escape sequence can be used to distinguish a byte having the start byte (or termination byte) value but intended as packet content from the start byte (or termination byte). As another example, the host-side command protocol and the accessory-side command protocol can specify different error-checking mechanisms.

In accordance with an embodiment of the invention, the host-side protocol can include "tunneling" commands that can be used by host device 302 to instruct intermediate device 306 to forward the payload of the command packet to accessory 304 and by intermediate device 306 to provide information originating from accessory 304 as a payload to host device 302. Similarly, the accessory-side protocol can also include tunneling commands that can be used by intermediate device 306 to provide information originating from host device 302 as a payload to accessory 304 and by accessory 304 to instruct intermediate device 306 to forward the payload of a command packet to host device 302.

Using the tunneling commands, intermediate device 306 can emulate a direct, point-to-point, bidirectional connection between the host and the accessory by forwarding information received from either device to the other device. This forwarding process is referred to herein as "tunneling" information from host device 302 to accessory 304 (or vice versa), and the information so forwarded is referred to herein as being "tunneled."

In one embodiment, the tunneled information may include commands from host device 302 to accessory 304 and/or commands from accessory 304 to host device 302; in some instances, the command may include a command code and/or associated data. Such commands can be defined according to a "tunnel" protocol that is understood by host device 302 and accessory 304; it is not required that intermediate device 306 understand the tunnel protocol. A specific example of a tunnel protocol is described below; it is to be understood that a tunnel protocol can be implemented to support any desired communication between host device 302 and accessory 304.

FIG. 4A shows table 400 listing tunneling commands for a host-side protocol according to an embodiment of the present invention. In this example, four tunneling commands are used between host device 302 and intermediate device 306; three other commands are provided to exchange status information related to the availability of accessory 304. Each command is sent only in one direction, either from host device 302 to intermediate device 306 (denoted H→I in table 400) or from intermediate device 306 to host device 302 (denoted I→H) in table 400.

The TxHTunnelToAccessory command can be sent by host device 302 to intermediate device 306 to initiate tunneling of a command to accessory 304. Its payload in one embodiment can be a command in the tunnel protocol and/or associated data that is to be tunneled to accessory 304. Upon receiving a TxHTunnelToAccessory command, intermediate device 306 repackages the payload as a payload of a tunneling command in the accessory-side protocol (e.g., as described below with reference to FIG. 4B) and sends the repackaged command to accessory 304. It should be noted that intermediate device 306 need not parse or otherwise interpret the content of the payload.

The AckHTunnelToAccessory command can be sent by intermediate device 306 to host device 302 to acknowledge receipt of a packet containing a TxHTunnelToAccessory command. The payload of the AckHTunnelToAccessory command can include the transaction ID of the TxHTunnelToAccessory packet that is being acknowledged and/or status information indicating whether the packet was successfully received by intermediate device 306. In some embodiments, after sending a TxHTunnelToAccessory command to intermediate device 306, host device 302 waits to send further such commands until a corresponding AckHTunnelToAccessory command indicating successful receipt by intermediate device 306 is received or until a timeout period expires. This can prevent host device 302 from sending tunneled commands faster than a rate supported by intermediate device 306 and/or accessory 304.

The TxHTunnelToHost command can be sent by intermediate device 306 to host device 302 to complete tunneling of a command originating from accessory 304. Its payload in one embodiment can be a command in the tunnel protocol and/or associated data that originated from accessory 304. Upon receiving a TxHTunnelToHost command, host device 302 can extract the payload and interpret the payload as a command in the tunnel protocol (i.e., a tunneled command); host device 302 can respond to the tunneled command, e.g., by generating another command in the tunnel protocol and using a TxHTunnelToAccessory command to send the new command to accessory 304.

The AckHTunnelToHost command can be sent by host device 302 to intermediate device 306 to acknowledge receipt of a packet containing a TxHTunnelToHost command. The payload of the AckHTunnelToHost command can include the transaction ID of the TxHTunnelToHost packet that is being acknowledged and/or status information indicating whether the packet was successfully received by host device 302. In some embodiments, after sending a TxHTunnelToHost command to host device 302, intermediate device 306 waits to send further such commands until a corresponding AckHTunnelToHost command is received or until a timeout period expires. This can prevent intermediate device 306 from sending tunneled commands faster than host device 302 can receive them. In some embodiments, intermediate device 306 does not forward the information contained in the AckHTunnelToHost command to accessory 304; any communication between host device 302 and accessory 304 related to acknowledging receipt or indicating errors is handled using tunneled commands.

The GetTunnelCtlToHost command can be sent by host device 302 to intermediate device 306 to request information as to the availability of accessory 304, e.g., whether accessory 304 is currently connected to intermediate device 306. In this embodiment, no payload is used.

The TxTunnelCtlToHost command can be sent by intermediate device 306 to host 302 to indicate the availability of accessory 304. The payload is a status field providing status information for accessory 304, such as whether accessory 304 is connected to intermediate device 306 and optionally other information about accessory 304. In some embodiments, a TxTunnelCtlToHost command can be sent by intermediate device 306 to host 302 in response to a GetTunnelCtlToHost command sent by host 302. In other embodiments, intermediate device 306 can automatically generate a TxTunnelCtlToHost command when the presence of accessory 304 is detected. For instance, as described below, accessory 304 can send an AStatusBeacon command to intermediate device 306, and receipt of this command may trigger intermediate device 306 to send a TxTunnelCtlToHost command to host device 302.

The AckTunnelCtlToHost command can be sent by host 302 to intermediate device 306 in response to a received TxTunnelCtlToHost command. This command can simply be an acknowledgement, with a transaction identifier of the command being acknowledged and status information indicating whether an error occurred.

FIG. 4B shows table 450 listing tunneling commands for an accessory-side protocol according to an embodiment of the present invention. In this example, five tunneling commands are used between accessory 304 and intermediate device 306. Each command is sent only in one direction, either from accessory 304 to intermediate device 306 (denoted A→I in table 450) or from intermediate device 306 to accessory 304 (denoted I→A) in table 450.

The TxATunnelToHost command can be sent by accessory 304 to intermediate device 306 to initiate tunneling of a command to host device 302. Its payload in one embodiment can be a command in the tunnel protocol and/or associated data that is to be tunneled to host device 302. Upon receiving a TxATunnelToHost command, intermediate device 306 repackages the payload as a payload of a tunneling command in the host-side protocol (e.g., as described above with reference to FIG. 4A) and sends the repackaged command to host device 302. It should be noted that intermediate device 306 need not parse or otherwise interpret the content of the payload.

The AckCmdFromAccessory command can be sent by intermediate device 306 to accessory 304 to acknowledge receipt of any command received from accessory 304, including a TxATunnelToHost command. The payload of the AckCmdFromAccessory command can include the transaction ID of the command packet that is being acknowledged and/or status information indicating whether the packet was successfully received by intermediate device 306. In some embodiments, after sending a TxATunnelToHost command to intermediate device 306, accessory 304 waits to send further such commands until a corresponding AckCmdFromAccessory command indicating receipt by intermediate device 306 is received or until a timeout period expires. This can prevent accessory 304 from sending tunneled commands faster than a rate supported by intermediate device 306 and/or host device 302.

The TxATunnelToAccessory command can be sent by intermediate device 306 to accessory 304 to complete tunneling of a command originating from host device 302. Its payload in one embodiment can be a command in the tunnel protocol and/or associated data that originated from host device 302. Upon receiving a TxATunnelToAccessory command, accessory 304 can extract the payload and interpret the payload as a command in the tunnel protocol (i.e., a tunneled command); accessory 304 can respond to the tunneled command, e.g., by generating another command in the tunnel protocol and using a TxATunnelToHost command to send the new command to host device 302.

The AckCmdToAccessory command can be sent by accessory 304 to intermediate device 306 to acknowledge receipt of any command packet from intermediate device 306, including a TxATunnelToAccessory command packet. The payload of the AckCmdToAccessory command can include the transaction ID of the TxATunnelToAccessory packet that is being acknowledged and/or status information indicating whether the packet was successfully received by accessory 304. In some embodiments, after sending a TxATunnelToAccessory command to accessory 304, intermediate device 306 waits to send further such commands until a corresponding AckCmdToAccessory command is received. This can prevent intermediate device 306 from sending tunneled commands faster than accessory 304 can receive them. In some embodiments, intermediate device 306 does not forward the information contained in the AckCmdToAccessory command to host device 302; any communication between accessory 304 and host device 302 related to acknowledging receipt or indicating errors is handled using tunneled commands.

The AStatusBeacon command can be sent by accessory 304 to intermediate device 306 to indicate that it is present and properly connected to intermediate device 306. In one embodiment, accessory 304 detects when a connection is made and begins to periodically send out AStatusBeacon commands to intermediate device 306 until such time as intermediate device 306 returns an AckCmdFromAccessory command. The payload of an AStatusBeacon command may include status information, such as whether accessory 304 is in need of charging, and intermediate device 306 can use the status information to control interactions with accessory 304 (e.g., supplying power to charge accessory 304).

It will be appreciated that the commands and packet formats described herein is illustrative and that variations and modifications are possible. For example start bytes, data protection and/or error correction fields, termination bytes, and the like may be included or not as desired in either or both of the host-side or accessory-side protocols. In some embodiments, data associated with a single command might be distributed across multiple packets, and some packets can contain only data (no command). Further, in some instances, data sent in response to a command can be sent without a command identifier. Specific command names are used by way of illustration, and other names can be substituted. Acknowledgement of a received command can be handled by a return packet, a separate signal, or other techniques; in some embodiments, acknowledgement of a tunneling command can be omitted. For example, the tunnel protocol can provide that an endpoint device (host or accessory) that receives a tunneled command send back an acknowledgement or other response as a separate tunneled command, and receipt of that acknowledgement or other response by the other endpoint device can be the only confirmation of a tunneling command.

Communication Process Using Tunneling

Figure 5:
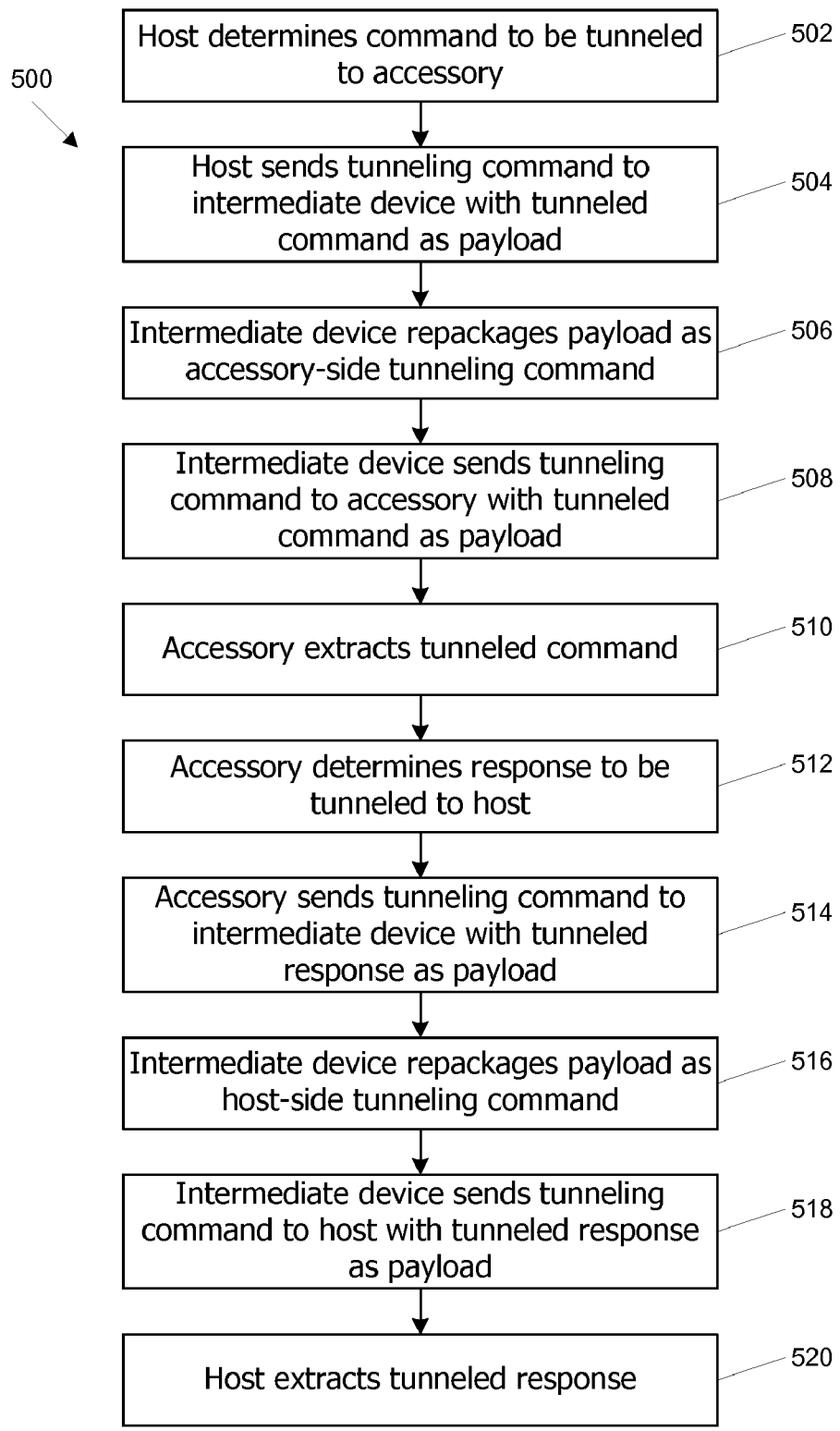
FIG. 5 is a flow diagram of a tunneling communication process between a host device and an accessory via an intermediate device according to an embodiment of the present invention.

FIG. 5 is a flow diagram of communication process 500 that can be used between host device 302 and accessory 304 according to an embodiment of the present invention. In process 500, host device 302 sends a first tunneled command, and accessory 304 responds with a second tunneled command; it is to be understood that the roles can be reversed, and that accessory 304 can send a tunneled command before receiving any tunneled commands from host device 302. Process 500 can be performed at any time when host device 302 and accessory 304 are both connected to intermediate device 306.

At step 502, host device 302 determines a command to be tunneled to accessory 304. For example, the tunneled command might request that accessory 304 provide an internal parameter value or state information to host device 302, or it might instruct accessory 304 to set an internal parameter value or change some aspect of its state. Examples of commands related to Bluetooth pairing that can be tunneled from host device 302 to accessory 304 are described below, but the present invention is not limited to these examples.

At step 504, host device 302 sends a host-side tunneling command (e.g., a TxHTunnelToAccessory command as shown in FIG. 4A) to intermediate device 306, with the tunneled command as the payload. In some embodiments, intermediate device 306 can send an acknowledgement (e.g., an AckHTunnelToAccessory command as shown in FIG. 4A) back to host device 302 upon receipt of the host-side tunneling command.

At step 506, intermediate device 306 repackages the payload of the host-side tunneling command (i.e., the tunneled command) as the payload of an accessory-side tunneling command (e.g., a TxATunnelToAccessory command as shown in FIG. 4B) and (step 508) sends the accessory-side tunneling command to accessory 304.

At step 510, accessory 304 receives the accessory-side tunneling command and can extract the tunneled command therefrom. In some embodiments, accessory 304 can send an acknowledgement (e.g., an AckCmdToAccessory command as shown in FIG. 4B) back to intermediate device 306 upon receipt of the accessory-side tunneling command.

Accessory 304 can then process the tunneled command. In this example, command processing results in accessory 304 determining, at step 512, a response to the tunneled command that is to be returned to host device 302. For instance, if the tunneled command requested a parameter value, accessory 304 can return the requested value; if the tunneled command instructed accessory 304 to change a parameter value or update its state, accessory 304 can return a confirmation that the instruction has been carried out. Alternatively, accessory 304 might respond by instructing host device 302 to provide a parameter value or update its own state via a new tunnel-protocol command.

At step 514, accessory 304 sends an accessory-side tunneling command (e.g., a TxATunnelToHost command as shown in FIG. 4B) to intermediate device 306, with the tunneled command response as the payload. In some embodiments, intermediate device 306 sends an acknowledgement (e.g., an AckCmdFromAccessory command as shown in FIG. 4B) back to accessory 304 upon receipt of the accessory-side tunneling command.

At step 516, intermediate device 306 repackages the payload of the accessory-side tunneling command (i.e., the tunneled command response) as the payload of a host-side tunneling command (e.g., a TxHTunnelToHost command as shown in FIG. 4A) and (step 518) sends the host-side tunneling command to host device 302.

At step 520, host device 302 receives the host-side tunneling command and can extract the tunneled command response therefrom. In some embodiments, host device 302 can send an acknowledgement (e.g., an AckHTunnelToHost command as shown in FIG. 4A) back to intermediate device 306 upon receipt of the host-side tunneling command.

In this manner, host device 302 and accessory 304 can communicate any number of commands and responses via intermediate device 306. It should be noted that any command or other information that can be created and/or processed by host device 302 and accessory 304 can be tunneled using the tunneling commands and methods described herein. It should also be noted that intermediate device 306 need not parse or otherwise interpret any of the tunneled information; the role of intermediate device 306 can be simply to repackage a payload of a received packet in a first protocol (e.g., host-side or accessory-side protocol) as a payload of a packet to be transmitted in a second protocol (e.g., accessory-side or host-side protocol).

Figure 6:
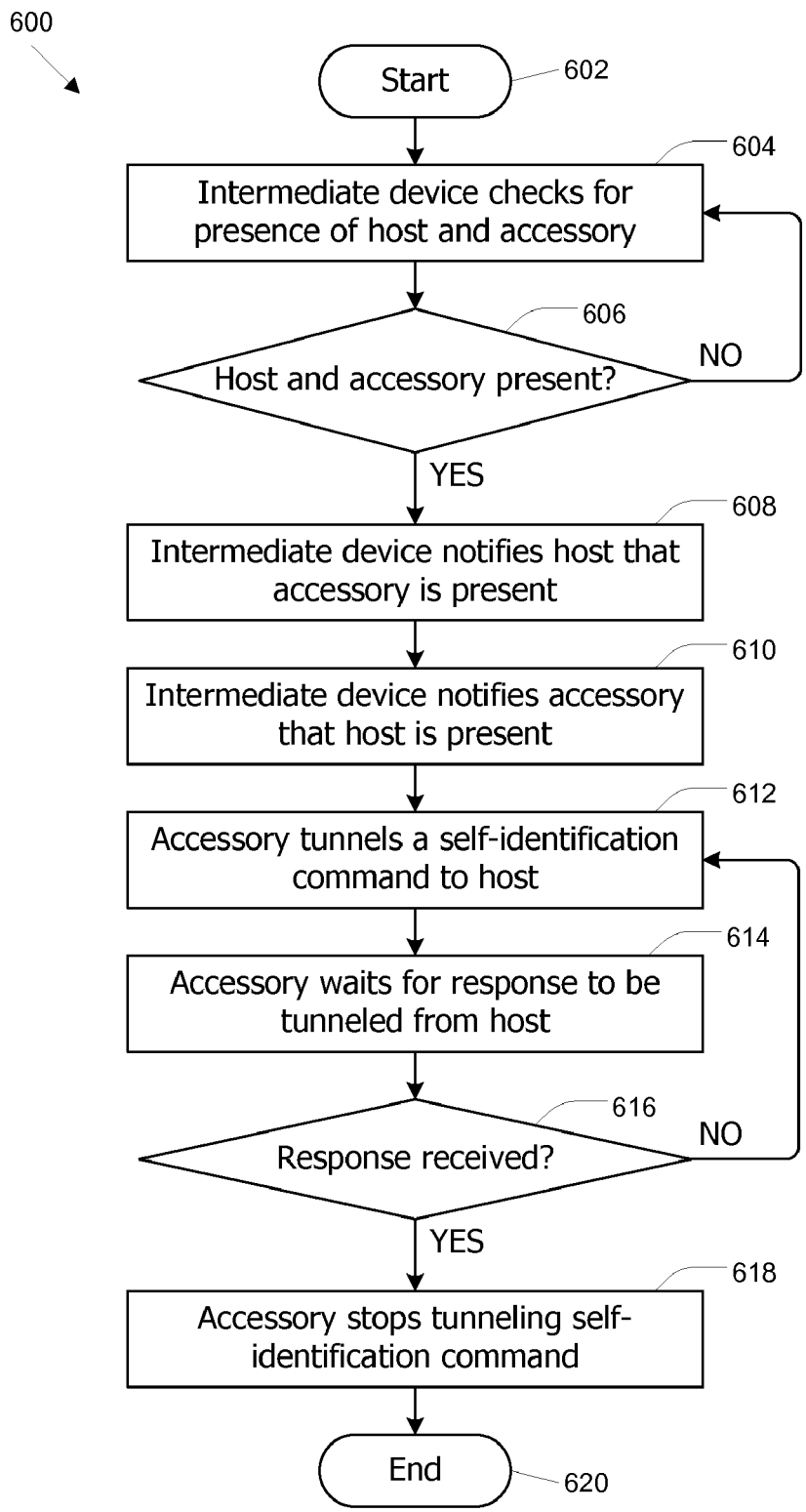
FIG. 6 is a flow diagram of a process for establishing the a tunneling connection between a host device and an accessory via an intermediate device according to an embodiment of the present invention.

Tunneling can be used at any time when host device 302 and accessory 304 are both communicably connected to intermediate device 306 and mutually aware of each other's presence. In some embodiments, intermediate device 306 can facilitate detection of this condition and can notify host device 302 of the presence of accessory 304 and vice versa. FIG. 6 is a flow diagram of a process 600 for establishing a tunneling connection between host device 302 and accessory 304 via intermediate device 306 according to an embodiment of the present invention.

When process 600 begins (step 602), neither host device 302 nor accessory 304 is connected to intermediate device 306. At step 604, intermediate device 306 checks for the presence of host device 302 and accessory 304. For example, in some embodiments, accessory 304 can detect when it becomes electrically coupled to intermediate device 306 and can periodically send the AStatusBeacon command of FIG. 4B while it is so coupled. Intermediate device 306 can check for this command on connection path 310; when this command is detected, intermediate device 306 can infer that accessory 304 is connected and available for communication. In some embodiments, establishing the connection between accessory 304 and intermediate device 306 may involve additional actions, e.g., authentication of intermediate device 306 as being authorized to communicate with accessory 304 or vice versa.

Similarly, in some embodiments, intermediate device 306 can detect when host device 302 is electrically coupled via connection 308; when host device 302 becomes coupled, intermediate device 306 can send a device identification command, identifying itself to host device 302. When host device 302 responds to the device identification command (e.g., with an acknowledgement command), intermediate device 306 can infer that host device 302 is connected and available for communication. In some embodiments, establishing the connection between host device 302 and intermediate device 306 may involve additional actions, e.g., authentication of intermediate device 306 as being authorized to communicate with host device 302 or vice versa.

Accordingly, step 604 may include intermediate device 306 checking for an incoming command or electrical signal indicating the presence of host device 302 and/or accessory 304. At step 606, intermediate device 606 can determine whether host device 302 and accessory 306 are both present. If not (e.g., if one or neither is present), process 600 can return to step 604 to check again. It is to be understood that a waiting period may be interposed between determining that at least one of host device 302 and accessory 306 is not present and checking again for presence of the missing device(s).

Eventually, host device 302 and accessory 304 are both present. When step 606 results in such a determination, process 600 can proceed to step 608, at which intermediate device 306 notifies host device 302 that accessory 304 is present, e.g., using a TxTunnelCtlToHost command with a payload indicating that the accessory is present as described above with reference to FIG. 4A. At step 610, intermediate device 306 can notify accessory 304 that host device 302 is present. In one embodiment, intermediate device 306 notifies host device 302 that an accessory device is present but does not provide specific identifying information for accessory 304. Similarly, intermediate device 306 can notify accessory 304 that a host device is present without providing specific identifying information for host device 304.

Thereafter host device 302 and accessory 304 can begin to exchange tunneling commands in accordance with the tunnel protocol. In one embodiment, accessory 304 can initiate the tunneling communication by tunneling a self-identification command, which is a command that includes accessory-identifying information, to host device 302 (step 612); accessory 304 then waits (step 614) for a response to be tunneled back from host device 302 by intermediate device 306. At step 616, accessory 304 determines whether a tunneled response has been received. If no response is received within a timeout period (which may be fixed or variable), then process 600 returns to step 612, and accessory 304 again tunnels the self-identification command to host device 302. When a tunneled response is received at step 616, process 600 proceeds to step 618, at which accessory 304 ceases to tunnel the self-identification command. Accessory 304 may then tunnel a different command to host device 302 or wait for further commands to be tunneled from host 302.

It will be appreciated that the communication processes described herein is illustrative and that variations and modifications are possible. Steps described as sequential may be executed in parallel, order of steps may be varied, and steps may be modified or combined. For instance, in one alternative embodiment, after receipt of a TxTunnelCtlToHost command indicating that accessory 304 is present, host device 302 can send a tunneled command requesting that accessory 304 identify itself. Receipt of this tunneled command by accessory 304 can serve as notification to accessory 304 that host device 302 is present, and accessory 304 can send its self-identification command in response to this tunneled command.

In still other embodiments, some steps may be omitted entirely. For example, in some embodiments, accessory 304 can periodically send the tunneled self-identification command whenever it is connected to intermediate device 306; if host device 302 is not also connected, there will be no response. In some embodiments, the status information in an AckCmdFromAccessory command (FIG. 4B) sent in response to a TxATunnelToHost command may indicate whether host device 302 is present.

Tunnel Protocol Commands for Wireless Pairing

As noted above, any type of information can be tunneled between host device 302 and accessory 304 via intermediate device 306. In some embodiments, the tunneled information can include tunneled commands and associated data defined according to a tunnel protocol.

In one embodiment of a tunnel protocol, each tunneled command can be a variable-length "message" that includes a fixed-length command ID (e.g., 1 byte, 2 bytes, etc.) followed by a variable amount of associated data (e.g., 0 or more bytes). The messages can be passed as payloads of packets as described above, and the packets can provide sufficient length information, error checking, etc. to support correct interpretation of a received message.

In some embodiments, some or all of the tunneled commands are related to configuring a wireless connection (e.g., a Bluetooth pairing) between host device 302 and the accessory 304. FIG. 7A is a table listing tunneled commands that can be sent by host device 302 to accessory 304 according to an embodiment of the present invention, and FIG. 7B is a table listing tunneled commands that can be sent by accessory 304 to host device 302 according to an embodiment of the present invention.

The HostAck command (FIG. 7A) can be sent by host device 302 to acknowledge a command from accessory 304 that does not require data in response. The HostAck command can be accompanied by data indicating the status of the received command, e.g., whether the command was successfully completed. In some embodiments, the HostAck command can also be sent to indicate an error in any received command, such as a bad parameter value, timeout or the like.

Similarly, the AccAck command (FIG. 7B) can be sent by accessory 304 to acknowledge a command from host device 302 that does not require data in response. The AccAck command can be accompanied by data indicating the status of the received command, e.g., whether the command was successfully completed. In some embodiments, the AccAck command can also be sent to indicate an error in any received command, such as a bad parameter value, timeout or the like.

The GetAccVersion command (FIG. 7A) can be sent by host device 302 to request that accessory 304 identify the version of the tunnel command protocol that it supports. In response, accessory 304 can return a RetAccVersion command (FIG. 7B) with the version information as the accompanying data. In one embodiment, the version information can include a major version identifier and a minor version identifier. Host device 302 can compare the received version identifiers to its own version identifiers to determine whether it is compatible with accessory 304. Various definitions of compatibility can be used. For example, in some embodiments, host device 302 is compatible with accessory 304 as long as they have the same major version identifier; in other embodiments, host device 302 is compatible with accessory 304 as long as the protocol version installed on host device 302 is not older than the protocol version installed on accessory 304. Still other tests for compatibility can be substituted for these examples. In some embodiments, host device 302 can notify the user (e.g., by displaying a message on a display screen) if it is not compatible with accessory 304.

The GetAccInfo command (FIG. 7A) can be sent by host device 302 to obtain information from accessory 304. In some embodiments, this command can support requests for multiple types of information, and a parameter accompanying the command specifies the requested information. For example, in one embodiment, host device 302 can use a parameter to request any of the following information: an identifier of accessory 304; version information for software or firmware running on accessory 304; power status information for accessory 304 (e.g., whether accessory 304 is operating from battery power, is charging, needs charging, etc.); or the number of pairing slots supported by accessory 304. Accessory 304 can respond using a RetAccInfo command (FIG. 7B) that includes the requested information. In one embodiment, the RetAccInfo command can be accompanied by the parameter that was received from host device 302 (indicating the type of information being returned) and the appropriate data values indicative of the requested information.

The GetAccBTAddr command (FIG. 7A) can be sent by host device 302 to obtain Bluetooth (or other wireless) address information for accessory 304. In some embodiments where accessory 304 supports multiple pairing slots, the command can be accompanied by an index indicating the pairing slot for which an address is being requested. Accessory 304 can respond using a RetAccBTAddr command (FIG. 7B) that includes the index specified by host device 304 and the Bluetooth address associated with the pairing slot corresponding to that index. In some embodiments, one of the pairing slots (e.g., index 0) can be reserved to store the Bluetooth address of accessory 304 while other pairing slots can be used to store the address and link key for each paired device. Thus, for example, host device 302 can use the GetAccBTAddr to determine the Bluetooth address of accessory 304 and to determine what (if any) devices are paired with accessory 304.

The SetAccBTAddr command (FIG. 7A) can be sent by host device 302 to set a Bluetooth address for one of the pairing slots of accessory 304. In embodiments where one of the pairing slots is reserved to store the Bluetooth address of accessory 304, host device 302 does not set a Bluetooth address for that slot. Addresses associated with other pairing slots can be set to any value host device 302 selects. Thus, for instance, host device 302 can establish a pairing with accessory 304 by setting the address for one of accessory 304's paring slots to the Bluetooth address associated with host device 302. SetAccBTAddr can also be used to remove a pairing, for instance by setting the address for that pairing to a recognized null state (e.g., a six-byte Bluetooth address can be set to (hex) FF.FF.FF.FF.FF.FF).

The GetAccBTState command (FIG. 7A) can be sent by host device 302 to obtain state information for accessory 304. In one embodiment, the state information simply indicates whether the Bluetooth transceiver of accessory 304 is on or off, and parameters identifying the state information need not be provided. In other embodiments, the state information may include other information items, such as whether any pairing slots are available, diagnostic information related to the Bluetooth transceiver of accessory 304 or the like; parameters identifying particular state information of interest may be used if desired. Accessory 304 can respond using a RetAccBTState command (FIG. 7B), with an accompanying data field that carries the requested state information.

The SetAccBTState command (FIG. 7A) can be sent by host device 302 to instruct accessory 304 to change its state. In some embodiments, any state information that is obtainable using GetAccBTState can be modified using SetAccBTState. Thus, for example, host device 302 can instruct accessory 304 to turn its Bluetooth transceiver on (or off).

The GetAccBTName command (FIG. 7A) can be used by host device 302 to retrieve a Bluetooth name associated with accessory 304. As is known in the art, a Bluetooth-enabled device can be assigned a name, e.g., a 32-byte character string, that can aid a user in recognizing the device. Accessory 304 can store its own Bluetooth name and can respond to a GetAccBTName command by using a RetAccBTName command, with the Bluetooth name of accessory 304 as the accompanying data. If accessory 304 does not have a Bluetooth name, it may return a value indicating the absence of a name (e.g., a null string).

The SetAccBTName command (FIG. 7A) can be used by host device 302 to set a new Bluetooth name for accessory 304. This command can be accompanied by a character string or other data indicating the new name to be used. In response, accessory 304 can store the new name in the appropriate local storage.

The DelAccBTPairs command (FIG. 7A) can be used by host device 302 to instruct accessory 304 to delete all of its Bluetooth pairings. In response, accessory 304 can set all pairing addresses to a recognized null state (e.g., a six-byte Bluetooth address can be set to (hex) FF.FF.FF.FF.FF.FF).

The AccIdentify command (FIG. 7B) can be used by accessory 304 to advise host device 302 of its presence when the two are initially connected. In some embodiments, accessory 304 periodically sends AccIdentify (e.g., as a tunneled command) whenever it is connected to intermediate device 306 until such time as a tunneled response is received from host device 302.

It will be appreciated that the commands described herein are illustrative and that variations and modifications are possible. It is contemplated that any or all of the commands in FIGS. 7A and 7B can be sent as tunneled commands via intermediate device 306 using the tunneling commands and host-side and accessory-side protocols described above. It is also contemplated that where a direct wired link is available between host device 302 and accessory 304, the commands might be sent directly along that link, without tunneling.

Other information can also be exchanged using the commands described above or additional commands. For example, in some embodiments, the commands can include commands to establish a link key for a pairing that is intended to communicate encrypted data. Bluetooth devices (and other devices) can support encrypted communication using symmetric-key cryptography, in which the same key (referred to herein as a "link key") can be used both for encryption and decryption. The link key is associated with a particular pairing and should be kept secret.

In some embodiments of the present invention, host device 302 can provide a link key for a particular pairing to accessory 304. For example, the SetAccBTAddr command may be accompanied by a link key as an additional parameter. Alternatively, the link key can be sent using a separate command. In still other embodiments, host device 302 might not send the link key directly and might instead send information that accessory 304 and host device 302 can each use to generate the same link key.

Wireless Pairing Process

Figure 8:
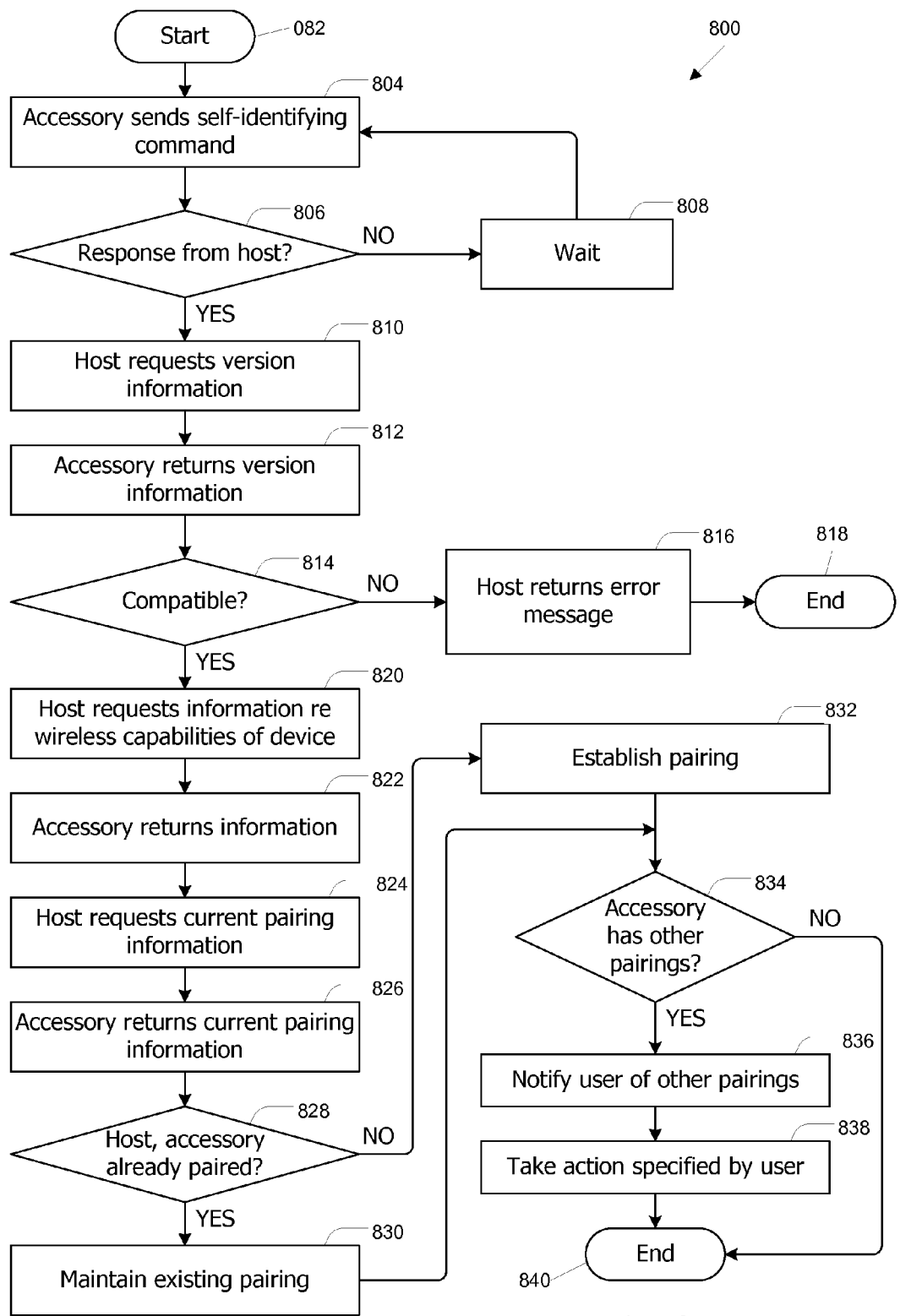
FIG. 8 is a flow diagram of a process for establishing a wireless link (e.g., a Bluetooth pairing) between a host device and an accessory according to an embodiment of the present invention.

FIG. 8 is a flow diagram of a process 800 for establishing a wireless link (e.g., a Bluetooth pairing) between a host device and an accessory according to an embodiment of the present invention. Process 800 begins (step 802) when an accessory (e.g., accessory 304 of FIG. 3) becomes connected to an intermediate device (e.g., intermediate device 306). For example, accessory 304 might be docked with a cradle or travel dock implementing intermediate device 306. At step 804, accessory 304 sends a self-identifying command to host device 302 using the tunnel protocol. For example, the self-identifying command can be the AccIdentify command of FIG. 7B, and accessory 304 can send this command as a tunneled command, e.g., using the TxATunnelToHost command of FIG. 4B. Intermediate device 306 attempts to repackage the self-identifying command and forward it to a host device. If a host device is not connected, intermediate device 306 may return the AckCmdToAccessory command of FIG. 4B with a status payload indicating that no host device is present.

At step 806, accessory 304 determines whether a response was received from a host device (e.g., host device 302). If no response was received, then accessory 304 can wait (step 808), e.g., for a specified timeout period, before retrying the sending of the self-identifying command (step 804).

Once host device 302 is connected to intermediate device 306, it can receive and respond to the self-identifying command from accessory 304. For example, host device 302 can respond by tunneling the GetAccVersion command of FIG. 7A to accessory 304, thereby requesting information as to tunnel protocol versions supported by accessory 304 (step 810). At step 812, accessory 304 can respond by providing the version information requested by host device 302, e.g., by tunneling the RetAccVersion command of FIG. 7B to host device 302.

At step 814, host device 302 uses the protocol version information provided by accessory 304 to determine whether accessory 304 and host device 302 are compatible with respect to the tunnel protocol. If not, then host device 302 can send an error message to accessory 304 (step 816), e.g., by tunneling the HostAck command of FIG. 7A to accessory 304 with status information indicating an incompatible protocol, and process 800 can end (step 818).

If, at step 814, host device 302 determines that the protocols are compatible, then at step 820, host device 302 can request information related to the wireless capabilities of accessory 304, e.g., by tunneling one or more GetAccInfo commands (FIG. 7A) to accessory 304. For example, host device 302 can request the number of pairing slots supported by accessory 304. Accessory 304 can return the requested information (step 822), e.g., by tunneling one or more RetAccInfo commands (FIG. 7B) to host device 302.

Host device 302 can also request current pairing information from accessory 304 (step 824), e.g., by tunneling one or more GetAccBTAddr commands (FIG. 7A) to accessory 304. For example, host device 302 can use multiple GetAccBTAddr commands with different index parameters to obtain the Bluetooth address of accessory 304 as well as Bluetooth addresses (and possibly other information) for any devices that may already be paired with accessory 304. Accessory 304 can provide the requested information (step 826), e.g., by tunneling one or more RetAccBTAddr commands (FIG. 7B) to host device 302. In one embodiment, host device 302 waits for a response to a first GetAccBTAddr from accessory 304 before tunneling any further commands to accessory 304, and steps 824 and 826 can be executed in a loop to obtain all desired pairing information.

At step 828, host device 302 uses the pairing information obtained from accessory 304 to determine whether host device 302 and accessory 304 are already paired. For example, host device 302 may search for its own Bluetooth address in a list of Bluetooth addresses with which accessory 304 is paired, or host device 302 may search for the Bluetooth address of accessory 304 in a list of accessories with which host device 302 is paired.

If host device 302 and accessory 304 are already paired, host device 302 may choose to maintain the existing pairing (step 830). If a pairing does not exist, or if host device 302 chooses to change parameters of the pairing, process 800 can proceed to step 832 to establish (or in some instances update) a pairing. For example, host device 302 can tunnel a SetAccBTAddr command (FIG. 7A) to accessory 304. The SetAccBTAddr command can include an index identifying the pairing slot to be used and a Bluetooth address (e.g., the Bluetooth address of host device 302) to be associated with the selected pairing slot. The SetAccBTAddr command may also include other information useful in establishing a pairing, such as a link key or other parameters. Because the pairing information is transmitted over wired, point-to-point connections, it is expected that the information can be kept secure while in transit.

At step 834, host device 302 determines whether accessory 304 has other Bluetooth pairings, in particular pairings with devices other than host device 302. For example, host device 302 can use the pairing information obtained during steps 824 and 826 to make this determination. If accessory 304 has other pairings, host device 302 can notify the user of the other detected pairings (step 836), e.g., by displaying a list of such pairings on a display screen of host device 302.

In some embodiments, the user may take various actions in response to the notification at step 836, and at step 838, host device 302 responds to the user action. For example, host device 302 can prompt the user to delete any or all of the Bluetooth pairings listed in the notification at step 836. A specific pairing can be deleted, e.g., by tunneling to accessory 304 a SetAccBTAddr command that sets the address for the pairing slot to a null state, such as (hex) FF.FF.FF.FF.FF.FF. Alternatively, all pairings can be deleted, e.g., by tunneling to accessory 304 a DelAccBTPairs command (FIG. 7A), after which the pairing with host device 302 can be recreated.

As another example, host device 302 might prompt the user to select which pairing should be the active pairing or the default pairing for accessory 304 and tunnel appropriate commands to accessory 304 to effect the user's selection.

Once a pairing is established and the user has been notified of other pairings, process 800 can end (step 840). It is to be understood that host device 302 and/or accessory 304 can thereafter remain connected to intermediate device 306 indefinitely without requiring process 800 to be repeated.

It will be appreciated that the Bluetooth pairing process and associated commands described herein are illustrative and that variations and modifications are possible. Steps described as sequential may be executed in parallel, order of steps may be varied, and steps may be modified or combined. In some embodiments, process 800 may be initiated in response to a user request rather than being initiated every time an accessory is connected to the intermediate device. For example, the user might operate a control located on host device 302, accessory 304, or intermediate device 306 (or another device, such as a computer system coupled to intermediate device 306) to indicate that a pairing should be established, after which process 800 can be performed without further user input. In particular, the user is not required to enter pin codes, Bluetooth addresses or other information into any device.

The particular information exchanged (e.g., wireless addresses, link keys) may vary from that described herein. Additional examples of information that may be exchanged to establish a Bluetooth pairing are described in commonly-owned co-pending U.S. patent application Ser. No. 11/513,616, filed Aug. 30, 2006, now U.S. Pat. No. 7,813,715, issued Oct. 12, 2010 and U.S. patent application Ser. No. 11/513,691, filed Aug. 30, 2006, now U.S. Pat. No. 7,913,297, issued Mar. 22, 2011, which are incorporated herein by reference in their entirety.

In addition, host device 302 in some embodiments can provide additional information to the user during the course of process 800, such as one or more messages on a display screen of host device 302 indicating whether a pairing was attempted or successful, identifying a paired accessory 304 by its Bluetooth name, and so on.

Figure 9A:
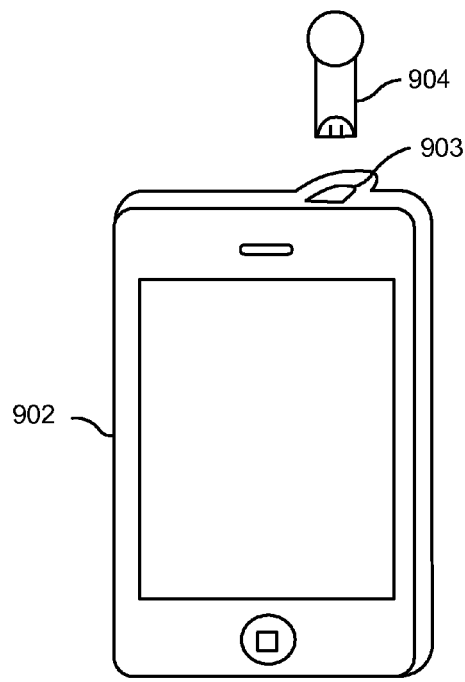
FIGS. 9A and 9B illustrate systems with a host device directly connected to an accessory to allow establishment of a wireless link (e.g., a Bluetooth pairing) according to an embodiment of the present invention.
Figure 9B:
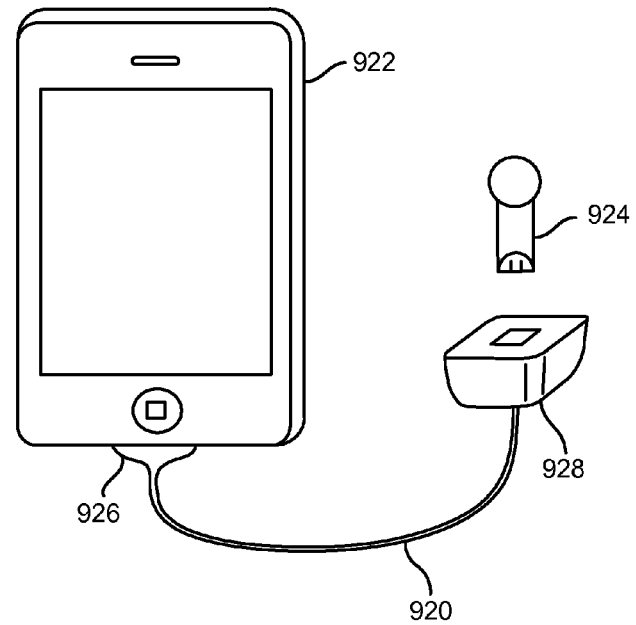

Further, although the embodiments described herein may make reference to commands between a host device and an accessory being tunneled through an intermediate device, those skilled in the art will appreciate that it is possible to design accessory 304 and/or host device 302 in such a way that the two can be directly coupled to exchange commands using a suitable protocol without tunneling, and that such commands can be used to establish a Bluetooth pairing (or other wireless connection) between a host device and an accessory. For example, as shown in FIG. 9A, host device 902 (which can be similar to host device 102, 202, or 302 described above) can include receptacle or bay 903 adapted to receive accessory 904 (which can be similar to accessory 104, 204, or 304 described above), and receptacle or bay 903 can be provided with an electrical connector that mates with a corresponding electrical connector of accessory 904. Alternatively, as shown in FIG. 9B, a cable 920 can be provided that is at one end 926 adapted to mate with a connector of host device 922 (which can be similar to host device 102, 202, or 302 described above) and at the other end 928 adapted to mate with a connector of accessory 924 (which can be similar to accessory 104, 204, or 304 described above). Other direct or indirect communication paths may also be provided.

Additional Embodiments

While the invention has been described with respect to specific embodiments, one skilled in the art will recognize that numerous modifications are possible. For example, although Bluetooth pairing is used herein as an example of an operation that can be performed using tunneled commands, it is to be understood that tunneling can also be used to perform other operations or communications between a host device and an accessory.

Those skilled in the art will appreciate that the terms "host device" and "accessory" are used herein to distinguish between two interoperable electronic devices. A "host device" can include any type of personal communication and/or computing device including but not limited to a media player, mobile phone, PDA, handheld computer, laptop computer, desktop computer, or the like. An "accessory" can include any device that facilitates use or enhances a capability of a host device; examples include telephone headsets (with earphone and microphone), stereo or monaural headphones, microphones, remote controls, keyboards, mice, etc.

An "intermediate device" as used herein can be any device capable of being connected to a host device and an accessory at the same time. The intermediate device can be capable of communicating with the host and the accessory, in particular forwarding, or tunneling, commands from one of the host/accessory to the other. The intermediate device may also support other functionality, such as charging the host device and/or the accessory. In some instances, the intermediate device may be capable of being concurrently connected to multiple host devices and/or multiple accessories.

More generally, the tunneling techniques described herein can be used to facilitate communication between two electronic devices via an intermediate device. For example, any alternative communication link (wired or wireless) between two devices can be configured using tunneling commands and an intermediate device capable of communicating with both devices. As another example, content stored on two portable electronic devices (e.g., mobile phone and PDA or media player and mobile phone) can be synchronized by coupling both devices to an intermediate device capable of communicating with both devices and tunneling appropriate data and commands to effect the synchronization.

Thus, although the invention has been described with respect to specific embodiments, it will be appreciated that the invention is intended to cover all modifications and equivalents within the scope of the following claims.

What is claimed is:

1. A system for communicating information between a host device and an accessory, the system comprising:
   an intermediate device configured to couple to a host device and to communicate with the host device according to a first protocol,
   the intermediate device being further configured to couple to an accessory interoperable with the host device and to communicate with the accessory according to a second protocol,
   wherein the first protocol includes a first plurality of commands, the first plurality of commands including a first tunneling command usable by the host device to instruct the intermediate device to forward tunneled information associated with the first tunneling command to the accessory, wherein the second protocol includes a second plurality of commands, the second plurality of commands including a second tunneling command usable by the intermediate device to deliver the tunneled information associated with the first tunneling command to the accessory, and wherein in response to receiving the first tunneling command, the intermediate device generates the second tunneling command and sends the second tunneling command to the accessory.

2. The system of claim 1 wherein:

the second protocol further includes a third tunneling command usable by the accessory to instruct the intermediate device to forward tunneled information associated with the third tunneling command to the host device, and the first protocol further includes a fourth tunneling command usable by the intermediate device to deliver the tunneled information associated with the third tunneling command to the host device.

3. The system of claim 1 wherein the tunneled information associated with the first tunneling command includes a command from the host device to the accessory.

4. The system of claim 3 wherein the tunneled information associated with the first tunneling command further includes data associated with the command from the host device to the accessory.

5. The system of claim 1 wherein the host device comprises a mobile telephone and the accessory comprises a wireless headset.

6. The system of claim 1 wherein the information associated with the first tunneling command includes information usable to establish a wireless communication channel between the host device and the accessory.

7. The system of claim 1, wherein in response to receiving another command in the first plurality of commands from the host device, the intermediate device responds to the host device without generating the second tunneling command to send to the accessory.

8. A system comprising:

a host device having a host communication interface;

an accessory having an accessory communication interface; and an intermediate device having a first intermediate device communication interface adapted to connect to the host communication interface and a second intermediate device communication interface adapted to connect to the accessory communication interface, wherein the intermediate device is configured to communicate with the host device using a first protocol and to communicate with the accessory using a second protocol, wherein each of the first protocol and the second protocol includes a tunneling command receivable by the intermediate device, the tunneling command in each of the first protocol and the second protocol instructing the intermediate device to use the other of the first protocol and the second protocol to forward a payload associated with the received tunneling command, wherein the intermediate device generates another tunneling command from the tunneling command in response to receiving the tunneling command.

9. The system of claim 8 wherein the tunneled information associated with a tunneling command received by the intermediate device from the host device includes a command from the host device to the accessory.

10. The system of claim 9 wherein the tunneled information associated with the tunneling command received by the intermediate device from the host device further includes data associated with the command from the host device to the accessory.

11. The system of claim 8 wherein the tunneled information associated with a tunneling command received by the intermediate device from the accessory includes a command from the accessory to the host device.

12. The system of claim 11 wherein the tunneled information associated with the tunneling command received by the intermediate device from the accessory further includes data associated with the command originated from the accessory.

13. The system of claim 8 wherein the host device comprises a mobile telephone and the accessory comprises a wireless headset.

14. The system of claim 13 wherein the information associated with the first tunneling command includes information usable to establish a wireless communication channel between the mobile telephone and the wireless headset.

15. A method for communicating information between a host device and an accessory, the method comprising:

determining, by a host device, an information item to be delivered to an accessory, the information item conforming to a tunnel protocol;

generating, by the host device, a first tunneling command to be delivered to an intermediate device, the first tunneling command conforming to a first protocol and incorporating the information item as tunneled information; and transmitting the first tunneling command to the intermediate device, wherein in response to receiving the first tunneling command, the intermediate device converts the first tunneling command to a second tunneling command conforming to a second protocol and incorporating the information item as tunneled information and transmits the second tunneling command to the accessory, thereby delivering the tunneled information item to the accessory.

16. The method of claim 15 wherein the information associated with the first tunneling command includes information usable to establish a wireless communication link between the host device and the accessory.

17. The method of claim 15 wherein the host device comprises a mobile telephone and the accessory comprises a wireless headset.

18. The method of claim 15 wherein the host device comprises a media player and the accessory comprises a wireless stereo headphone.

19. A method for communicating information between a first electronic device and a second electronic device, the method comprising:

determining, by a first electronic device, an information item to be delivered to a second electronic device, the information item conforming to a tunnel protocol;

generating, by the first electronic device, a first tunneling command to be delivered to an intermediate device, the first tunneling command conforming to a first protocol and incorporating the information item as tunneled information; and transmitting, by the first electronic device, the first tunneling command to the intermediate device;

converting, by the intermediate device, the first tunneling command to a second tunneling command in response to receiving the first tunneling command, the second tunneling command conforming to a second protocol and incorporating the information item as tunneled information;

transmitting, by the intermediate device, the second tunneling command to the second electronic device;

receiving, by the second electronic device, the second tunneling command; and extracting, by the second device, the information item from the second tunneling command.

20. The method of claim 19 wherein the first electronic device is a host device and the second electronic device is an accessory for the host device.

21. The method of claim 20 wherein the information to be delivered to the accessory includes information usable to establish a wireless communication link between the host device and the accessory.

22. The method of claim 20 wherein the host device comprises a mobile telephone and the accessory comprises a wireless headset.

23. The method of claim 20 wherein the host device comprises a media player and the accessory comprises a wireless stereo headphone.

24. A method for communicating information between a first electronic device and a second electronic device, the method comprising:

receiving, by an intermediate device, a first tunneling command from a first electronic device, the first tunneling command conforming to a first protocol and incorporating a tunneled information item therein, wherein the first protocol includes a plurality of commands in addition to the first tunneling command;

converting, by the intermediate device, the first tunneling command to a second tunneling command in response to receiving the first tunneling command from the first electronic device, the second tunneling command conforming to a second protocol and incorporating the tunneled information item therein; and transmitting, by the intermediate device, the second tunneling command to a second electronic device, the second electronic device being configured to extract the tunneled information item from the second tunneling command.

25. The method of claim 24 further comprising:

receiving, by the intermediate device a status beacon command from the second electronic device, the status beacon command conforming to the second protocol; and sending a notification to the first electronic device, by the intermediate device, in response to the status beacon command, the notification conforming to the first protocol and indicating that the second electronic device is present.

* * * * *